Oct. 13, 1964      E. LAKATOS      3,153,237

SIGNAL PROCESSING APPARATUS

Filed Nov. 20, 1958      4 Sheets-Sheet 1

EMORY LAKATOS
INVENTOR.

BY

ATTORNEY

EMORY LAKATOS
INVENTOR.

United States Patent Office 3,153,237
Patented Oct. 13, 1964

3,153,237
SIGNAL PROCESSING APPARATUS
Emory Lakatos, Santa Monica, Calif., assignor to Thompson Ramo Wooldridge Inc., Hawthorne, Calif., a corporation of Ohio
Filed Nov. 20, 1958, Ser. No. 775,297
11 Claims. (Cl. 343—105)

This invention relates to the measurement of time delay or phase difference between two amplitude-time varying functions, and particularly to a method of and means for determining the relative time delay between two electrical alternating current signals; the delay representing the difference in transmission time of signal wave energy over two different paths.

In one known method of air traffic control, a relatively broad band message signal or other relatively broad band signal carried by radio waves is sent out from one source, which may be an aircraft whose position must be located, and is picked up at a plurality of mutually spaced receiving stations, operating in pairs. In each pair, the time of arrival of the message at one station is compared with the time of arrival of the message at the other station, and the difference in these times, or delay, is determined. The value of this time delay is then utilized to make computation as to the location of the aircraft.

One method used to measure this time difference, or delay, is known as amplitude correlation. Amplitude correlation comprises introducing a known time delay between the two signals (the two message versions picked up at a pair of receiving stations), multiplying one signal by the other signal, and averaging the product over a specified length of time to produce an output signal. This is repeated for other values of time delay, and the value of imposed time delay producing the maximum value of output signal is equal to the initial value of time delay between the received signals.

The requirement of introducing a number of delays sometimes makes it necessary to have a number of channels associated with the amplitude correlator apparatus, one for each delay, thus making the equipment extremely complicated.

It is, therefore, an object of this invention to provide a simplified method of and means for determining the time displacement between two amplitude time-varying functions.

A further object is to provide simplified means for determining the relative time displacement between two electrical signals, the time displacement representing the difference in transmission time of signal information over two substantially different paths or channels.

Amplitude correlators in general use have the disadvantage that noise as well as signal information is multiplied and averaged to give a noise component in the output signal which may be so large as to completely mask the information component.

Furthermore, the circuits required to carry out the multiplication and averaging functions are relatively complex and critical, since they have to be designed with due regard for such factors as linearity and distortion among others.

It is, therefore, another object of this invention to provide a novel means for determining the relative phase between two time displaced versions of an alternating current signal which are less sensitive to extraneous noise than are prior art correlators.

Another object of this invention is to provide novel means for determining the relative phase between two time displaced versions of an alternating current signal through the use of simpler circuitry than that used in prior art correlators.

The present invention provides a novel method and apparatus for determining the relative time displacement between two amplitude time varying functions, such as two electrical alternating current signals, by detecting the incidence of points at a predetermined level with respect to each of said functions, and comparing information as to the occurrence of said points in one function with like information relating to the other function.

In accordance with certain embodiments of the invention, there are provided means responsive to one of two time displaced electrical alternating current signals for developing an indicating signal containing amplitude variations, or impulses, representing the zero crossing of said alternating current signal. The phrase "zero crossings" will be understood to mean those incidents defined by the actual intersection of the signal wave form with its alternating current axis or other reference amplitude levels specifically assigned to the wave form. Means are also provided for developing a similar indicating signal representing the zero crossings of the other alternating current signal. These indicating signals are then applied to a counter means where counts are made of the time intervals between zero crossings and the number of zero crossings in both signals. Based on these counts, an output signal is produced in said counter means which represents the time displacement between said two alternating current signals.

In accordance with a different embodiment, a series of discrete delays is introduced between the two time displaced signals, and for each delay, indicating signals are developed as before. The two indicating signals containing impulses representing the zero crossings of the two time displaced signals are used to energize a gate for a predetermined short time interval, successively at times corresponding to the occurrence of said impulses. A counter means operable upon the occurrence of at least one impulse from each of said indicating signals during said short time intervals produces an output signal which is a function of the frequency with which pairs of said impulses are applied to the counter means. Coincidence of the two signals is evidenced when the output signal is maximized. The value of imposed delay corresponding to the maximum signal is thus equal to the initial time displacement to be measured.

Figure 1:
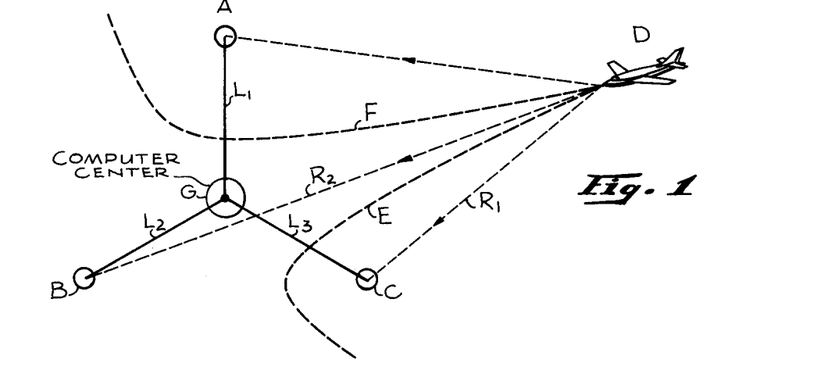
FIG. 1 is a schematic view showing one system of aircraft control wherein the present invention finds particular utility.

FIG. 1 shows one type of air traffic control system wherein the present invention may be utilized. The system includes three receiving stations A, B, and C which receive modulated energy radiated from an aircraft D. Considering a pair of these stations B and C, it can be shown that the point of location of the aircraft D lies somewhere on a certain first hyperbola E, which can be plotted with respect to the points B and C. The nature of this first hyperbola E is such that the difference in the distances of any point thereon from the two fixed points B and C is a constant. Thus, the difference $(R_2-R_1)$ in the distances $R_2$ and $R_1$ of the aircraft D from stations B and C respectively, can be utilized to determine the locus of the first hyperbola E. Similarly, a second hyperbola F can be drawn for another pair of stations A and B, and the intersection of the two hyperbolas E and F will determine the location of the aircraft D.

To determine the difference in the distances of any two of the stations from the aircraft D, an observation is made of the difference in time of arrival at the two stations of a signal transmitted by the aircraft. In the station arrangement, and for the particular location of aircraft D illustrated, the signal will arrive later at station B than at station C because of the longer transmission path from D to station B than from D to station C.

The signals received at the stations A, B, and C are fed into a computer center G by way of communications links $L_1$, $L_2$, and $L_3$, such as transmission lines. Knowing the distance from the center G to each of the receiving stations A, B, and C, the difference between the paths taken by energy from the aircraft D to each pair of stations is determined at the center G and utilized to compute the position of the aircraft D.

According to one known system, the signal transmitted by the aircraft may be a broad-band, noise-like message of predetermined duration which may be repeated at prescribed intervals. The interval at which the message is repeated is substantially longer than the duration of the message, so that there will be no ambiguity as to whether the two received versions being compared at any given time originated at the same time of transmission.

Since, in this system, the broad-band, noise-like message by its nature is non-periodic, and since it may be corrupted by extraneous noise such as thermal noise generated within the receiver picking up the message, or by natural atmospheric noise picked up along the transmission path, it is difficult to determine the beginning and end of the message with the precision required, which may be of the order of a few microseconds. Therefore, a relatively long message is used, and the two versions of the message received by the two stations, such as B and C, are compared by conventional signal correlation techniques for the duration of the message to determine the time delay. However, as pointed out above, known correlation techniques employ apparatus which is relatively complex, generally using a plurality of substantially identical processing channels and, on the over-all, requiring a considerable bulk of equipment. The present invention, however, provides a simplified method of and means for comparing the two coherent time displaced versions and thereby determining the relative time delay between the two versions with equipment of much less complex and bulky nature.

In accordance with this invention, the two versions of the message represented in FIG. 2 as version 1 and version 2 wave forms as they appear after demodulation by the receivers, associated with channels 1 and 2 respectively, are compared in the following way. Points are found on each of the waves which occur at some predetermined level or threshold potential. Preferably, the alternating current axis of the wave is selected, for this would generally define the greatest number of zero crossing points. Accordingly, there are obtained a number of zero crossings for each of the two waves.

Figure 2:
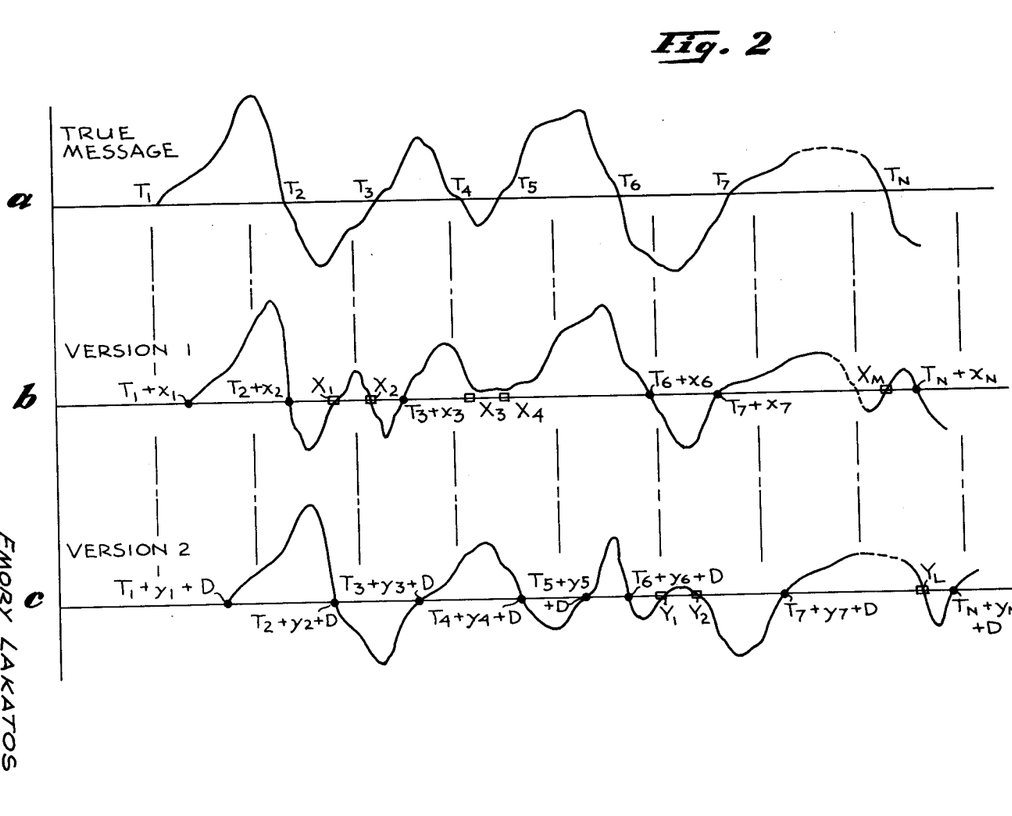
FIG. 2 is a graph showing wave forms of two time displaced versions of a message and illustrating one method of determining the time displacement according to the invention.

Assume that the true message, shown on line A of FIG. 2, is characterized by N zero crossings occurring at times $T_1$, $T_2$, $T_3$, $T_4$, $T_5$, $T_6$, $T_7$, ... $T_n$. Because of the presence of noise in channel 1, the actual zero crossings are shifted small random amounts $x_1$, $x_2$, $x_3$, ... so that the crossings in version 1, shown in line B, occur at $T_1+x_1$, $T_2+x_2$, $T_3+x_3$ ... $T_n+x_n$. In addition, assume that M spurious zero crossings caused by noise occur at times $X_1$, $X_2$, $X_3$, $X_4$, ... $X_M$. These extra crossings may sometimes be negative in the sense that the noise may delete some of the crossings in the true message. In the figure shown, for example, $X_1$ and $X_2$ represent additional crossings in version 1 which do not appear in the true message whereas the deletions of crossings $T_4$ and $T_5$ in the true message are represented by the absence of crossings at $X_3$ and $X_4$ in version 1. It appears that extra crossings as well as deletions are created in pairs, as shown by the pair of crossings at $X_1$ and $X_2$ and the pair of deletions corresponding to $X_3$ and $X_4$.

If we let D represent the relative delay in the arrival of the true message at channel 2, zero crossings would occur at $T_1+D$, $T_2+D$, $T_3+D$, ... $T_n+D$. Because of the perturbing effects of noise, these crossings are shifted by small random amounts, $y_1$, $y_2$, $y_3$, etc. Thus the actual crossings in version 2 (line C) occur at $T_1+y_1+D$, $T_2+y_2+D$ ... $T_n+y_n+D$. In addition, L spurious crossings may exist at times $Y_1$, $Y_2$, ... $Y_L$.

Let $S_1$ be the sum of the various times at which zero crossings occur within a predetermined interval of time $T_d$ in channel 1, reckoned from the beginning of the message at time $T_1+x_1$. Then $$S_1 = \sum_1^N (T_i + x_i) + \sum_1^M X_j \quad (1)$$

In a similar manner, for channel 2

$$S_2 = \sum_1^N (T_k + y_k + D) + \sum_1^L Y_k \quad (2)$$

Subtracting, $$S_1 - S_2 = -ND + \sum_1^N (x_i - y_k) + \sum_1^M X_j - \sum_1^L Y_k \quad (3)$$

Thus the difference of these sums contains a term ND proportional to the delay as well as the algebraic sums of various random contributions.

Then $$D = \left[ S_2 - S_1 - \sum_1^N (x_i - y_k) - \sum_1^M X_j + \sum_1^L Y_k \right]/4 \quad (4)$$

A few approximations will have to be made. First, the number of true crossings N is not exactly known. However, a good estimate may be obtained by replacing N by $(2N+M+L)/2$, which is the average of the total number of actual crossings in both versions. It is expected that M and L will be very small compared to N and the error in replacing N by the above value will be negligible.

Secondly, the fluctuations in crossing times, $x$, and $y$ are random. Any $x$ or $y$ crossing fluctuation is just as likely to be positive as negative. Thus the expected or mean value of the quantity $$\frac{2\Sigma(x_j - y_k)}{(2N+M+L)}$$

is zero. If the message is long and/or broad band, the error from this source may be assumed as negligible since N will then be vary large.

Equation 4 may be simplified still further by employing statistical methods, as follows. In channel 1, let $\tau_1$ be the interval between the beginning of message version 1 and the occurrence of the first spurious zero; $\tau_2$, the interval between the first and second spurious zeros; $\tau_3$, between second and third spurious zeros; etc.

Then $$\sum_1^M X_j = \tau_1 + (\tau_1+\tau_2) + (\tau_1+\tau_2+\tau_3) + \ldots (\tau_1+\tau_2+\tau_3$$
$$+ \ldots \tau_M) = M\tau_1 + (M-1)\tau_2 + (M-2)\tau_3 + \ldots \tau_M$$

These various $\tau$'s are random, having some mean value $\overline{\tau}$. Then, the expected or mean value of $\Sigma X_j$, after substituting $\bar{\tau}$ for the various $\tau$'s and summing the series, may be expressed thus:

$$E\left(\sum_1^M X_j\right) = M(M+1)\bar{\tau}/2$$

If $T_d$ is the duration of the message, then $$\bar{\tau}M = T_d$$

and hence $$E\left(\sum_1^M X_j\right) = T_d(M+1)/2 \quad (5)$$

The number of spurious crossings in version 2 may not be the same as for version 1. By a similar argument $$E\left(\sum_1^L Y_k\right) = T_d(L+1)/2 \quad (6)$$

Making use of the above methods, Equation 4 becomes $$D = \frac{(S_2 - S_1) - T_d(M-L)/2}{N + (M+L)/2} \quad (7)$$

This represents a good estimate of the most probable value of the time delay D between the two message versions 1 and 2. It will now be shown how the method of the invention can be practiced by means of novel apparatus acting to compute the delay D as expressed in Equation 7.

Figure 3:
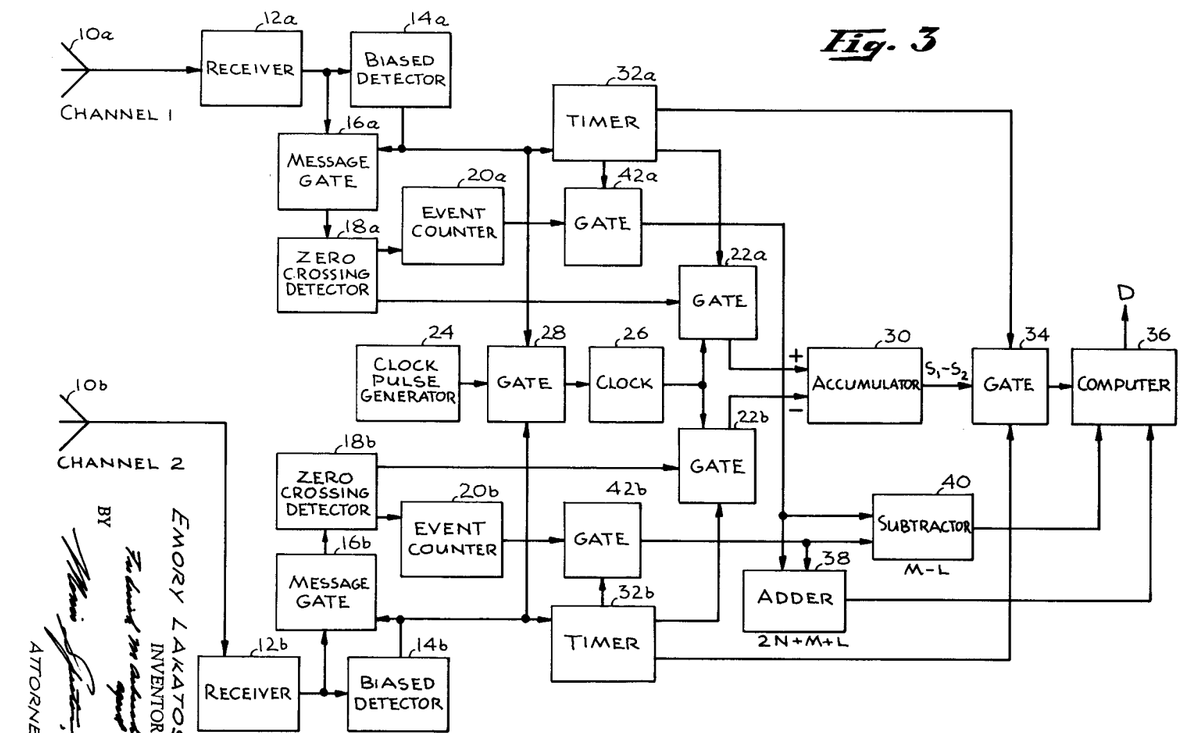
FIG. 3 is a block diagram showing one form of apparatus for measuring the relative time displacement between two message versions in accordance with the invention.

One form of apparatus for carrying out the method of the invention is shown in the block diagram of FIG. 3. The message versions 1 and 2 associated with channels 1 and 2 are picked up by antennas 10a and 10b and fed to receivers 12a and 12b. The outputs of the receivers 12a and 12b go to biased detectors 14a and 14b and a pair of gates 16a and 16b. The function of these detectors 14a and 14b is to determine the beginning of the message in the two channels. The detectors 14a and 14b may be rectifiers of the vacuum tube, gaseous tube or solid state variety, which are biased in such a way as to conduct only when the incoming signal exceeds a predetermined threshold signal level which is above the average wire level. The detectors 14a and 14b enable the gates 16a and 16b to pass the outputs of the receivers 12a and 12b respectively, to zero crossing detectors 18a and 18b, which are connected to the gates 16a and 16b. The zero crossing detectors 18a and 18b generate a pulse each time their respective message versions cross the zero axis, as will be described in more detail. The number of the zero crossings or pulses, in each of the channels is recorded by event counters 20a and 20b, which are connected to the outputs of the zero crossing detectors 18a and 18b.

The ouput of the event counter 20a in channel 1 is then some quantity $N+M$, which is the sum of the number of actual crossings N plus the number of spurious crossings M in version 1. Similarly the output of the event counter 20b in channel 2 is a quantity $N+L$, where L is the number of spurious zeros in version 2.

The outputs of the zero crossing detectors 18a and 18b are also fed to a pair of gates 22a and 22b. Gate 22a is enabled by a pulse detector 18a each time a zero crossing occurs in channel 1. Similarly, gate 22b is enabled by a pulse from detector 18b upon the occurrence of a zero crossing in channel 2.

A continuously running pulse generator 24 generates a train of periodically recurrent pulses having a spacing which is relatively small compared to the expected average spacing between zero crossings. The train of pulses is fed to a clock 26 through a gate 28 which is controlled by the outputs of the biased detectors 14a and 14b in each of the channels 1 and 2. Whichever detector operates first will seize control of the gate 28 and the gate 28 is henceforth enabled until the system is cleared.

The output of the clock 26, is fed to an accumulator 30 through either one of the gates 22a and 22b, which-ever one happens to be enabled at a given time. When gate 22a in channel 1 is operating the accumulator 30 receives the accumulated clock reading with a plus signal. When gate 22b is enabled the accumulator 30 receives the accumulated clock reading with a minus sign. Thus, if gate 22a opens at times $T_1+x_1$, $T_2+x_2$, $X_1$, $X_2$, etc. and gate 22b opens at times $(T_1+y_1+D)$, $(T_2+y_2+D)$, $(T_3+y_3+D)$, etc. the accumulator reading would be $$T_1+x_1+T_2+x_2+X_1+X_2 \ldots$$
$$-(T_1+y_1+D)-(T_2+y_2+D)-(T_3+y_3+D) \ldots$$

It will be seen that at the end of the run the reading of the accumulator will be the quantity $S_2-S_1$, where $S_1$ and $S_2$ are the quantities defined in Equations 1 and 2.

Each of the biased detectors 14a and 14b is connected to a timer designated 32a and 32b respectively. Each of the timers 32a and 32b is designed to run for a predetermined time $T_d$, the duration of the message, after receiving a starting signal from its associated biased detector. When the time interval $T_d$ has elapsed in channel 1, the timer 32a associated therewith disables gate 22a and prevents the reception of any additional data from channel 1. Likewise, the timer 32b will open channel 2 by disabling the gate 22b in channel 2. When both timers 32a and 32b have stopped, a gate 34 connected to the output of the accumulator 30 is enabled and the accumulator reading is transferred to a computer 36 connected to the output of the gate 34.

The outputs of the event counters 20a and 20b are fed to an adder 38 and a subtracter 40 through a pair of gates 42a and 42b respectively. These gates 42a and 42b are controlled by the timers 32a and 32b respectively. At the end of the time interval $T_d$, when the timer 32a in channel 1 stops, the reading of the event counter 20a in channel 1 is transferred to the adder 38 and subtracter 40. Likewise, when the timer 32b in channel 2 stops at the end of the predetermined time interval $T_d$, the reading of the event counter 20b in channel 2 is transferred to the adder 38 and the subtracter 40. When this happens, the adder will show the sum $(2N+M+L)$ of the number of events or zero crossings that have occurred in the two channels and the subtracter will show the difference $(M-L)$ of the number of events with the proper algebraic signs. These two quantities are also fed to the computer. Having received the quantities $$S_2-S_1, 2N+M+L \text{ and } M-L$$

the computer will then compute the value of the time delay in accordance with Equation 7 previously set forth.

If, in Equation 4 the quantity $\Sigma X_j + \Sigma Y_k$ is neglected, the equation reduces to the form $D = N + (M+L)/2$. This simplification could be brought about by neglecting the effect of the spurious zeros in the computation. This may be accomplished by utilizing an adequately long and/or broad band message so that the number of zeros would be very large and the quantity $\Sigma X_j + \Sigma Y_k$ would cancel out to zero. In this event, the subtracter 40 could be eliminated in the apparatus and the computer 36 could be simplified.

Figure 4:
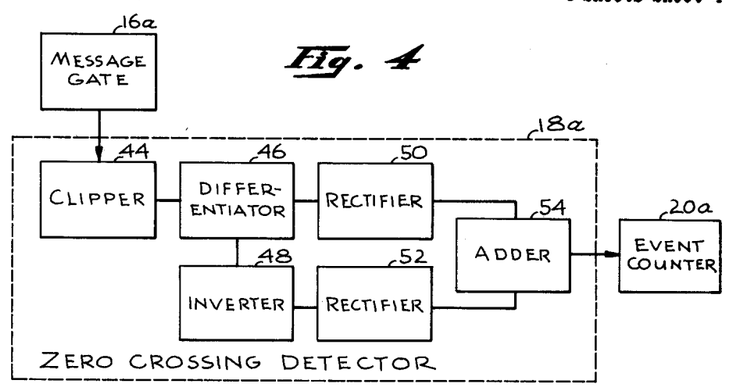
FIG. 4 is a block diagram showing in more detail a portion of the apparatus of FIG. 3.
Figure 5:
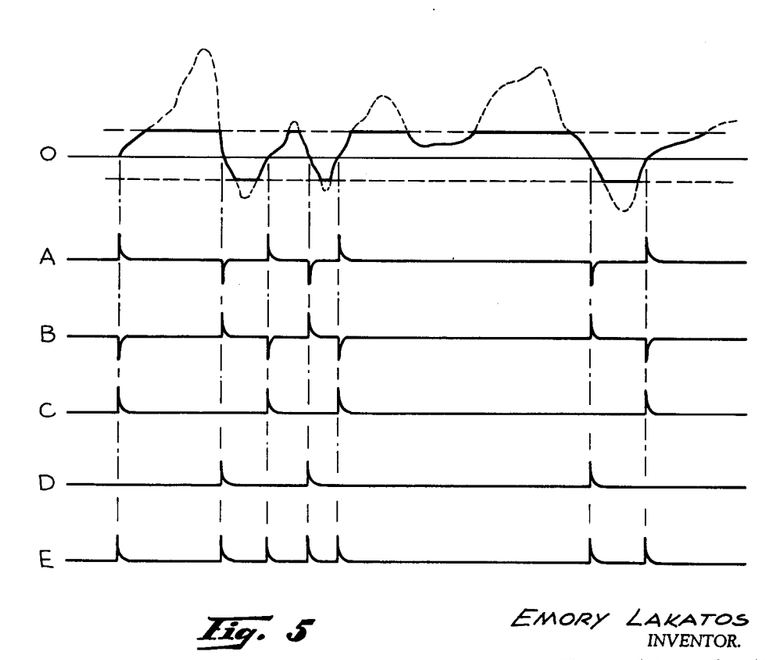
FIG. 5 is a series of graphs showing wave forms useful in explaining the operation of the portion of the apparatus of FIG. 4.

The zero crossing detectors and their operation is shown in more detail in FIGS. 4 and 5. For convenience, only one of the detectors will be described, and it will serve to describe both of them. Considering channel 1, version 1 in the output of the message gate 16a is sent through a clipper 44 and then through a differentiator 46 to produce a series of positive and negative pulses as shown in line A of FIG. 5. Part of the output of the differentiator 46 is sent through an inverter 48 to produce a series of pulses (line B) which are inverted with respect to those of line A. The two series of pulses are then sent through rectifiers 50 and 52, so as to remove the negative pulses from lines A and B and leave only positive ones as shown in lines C and D respectively. These positive pulses are then combined in an adder 54 to produce a resultant series of positive pulses as shown in line E, each positive pulse appearing at a zero crossing in version 1. The positive pulses in the output of the adder 54 thus represent the zero crossings in version 1.

The time delay between the two message versions may also be computed by a different method which will be called the centroid method. In this method, the delay is defined by the following equation:

$$D = S_1/N_1 - S_2/N_2$$

where $N_1$ and $N_2$ are the respective number of crossings in the two channels and $S_1$ and $S_2$ are the respective accumulated time readings as previously defined. The quantity $S_1/N_1$ may be termed the centroid of channel 1 and the quantity $S_2/N_2$ may be termed the centroid of version 2. The delay D then reduces to the difference between the centroids of the two message versions.

If the message is white noise, i.e., having a flat spectral distribution of power versus frequency over a band extending from zero to B cycles per second, it turns out, statistically, that the root-mean-square fluctuation in the location of the centroid varies inversely with the square root of the band width of the message and varies directly with the square root of the message duration. This can be stated mathematically as follows:

$$V = 0.10 \propto \frac{\sqrt{T_d}}{\sqrt{B}}$$

where V is the fluctuation in the centroid, $T_d$ is the duration of the message, and B is the band width of the message. It follows that for a fixed allowable error in a given band width there is an upper limit for the usuable duration of a message. For instance, if the allowable error is 1 microsecond and the band width is 1 megacycle, the message duration must not be greater than 100 microseconds. In such a case, the expected number of zero crossings would be over 100, which is not an unreasonably small number.

If, on the other hand, the allowable error is 10 microseconds, as may be permissible, in some applications using radio transmission, the duration could be as high as 10,000 microseconds. In this case, there would be over 10,000 crossings.

If the band width is reduced from 1 megacycle per second to 5,000 cycles per second and the allowable error is 10 microseconds, the message duration reduces to 50 microseconds. However, such a combination of bandwidth and message duration would be of little value, since not more than one zero crossing would be expected.

It is seen that once the acceptable error is fixed, the selection of the band width and the duration of the message cannot be arbitrarily made. In any case, the bandwidth should be as high as possible to produce a reasonably high number of zero crossings.

For use in computing the value of time delay by the centroid method, the apparatus of FIG. 3 may be modified in the following way: The adder 38 and subtracter 40 may be eliminated and the outputs of the event counters 20a and 20b in the two channels may be fed directly to the computer 36.

By means of the two foregoing methods the relative delay between two versions of a message is computed by means of a single group of measurements. This results in a great simplification of equipment, by eliminating the necessity for a great many information channels which is inherent in the amplitude correlation method. Furthermore, the problems associated with multipliers and averaging circuits are eliminated by employing more precise and simpler counting circuits.

There will now be described a third method by which relative delay between two versions of a signal may be computed by utilizing the zero crossings of the two versions. In this method, the two versions are shifted with respect to each other by known amounts of delay, and a species of correlation function is computed which is based on associations of pairs of crossings of the two versions as a function of the amounts of shift. For each amount of introduced delay, a signal output is obtained. The amount of imposed delay which corresponds to the maximum signal output is then equal to the actual delay between the two versions. Although this third method does not have the advantage of reducing the number of information channels required, as does the first two, it retains the advantage of eliminating the relatively critical multiplier and averaging circuits. Furthermore, the circuits used are greatly simplified.

Figure 6:
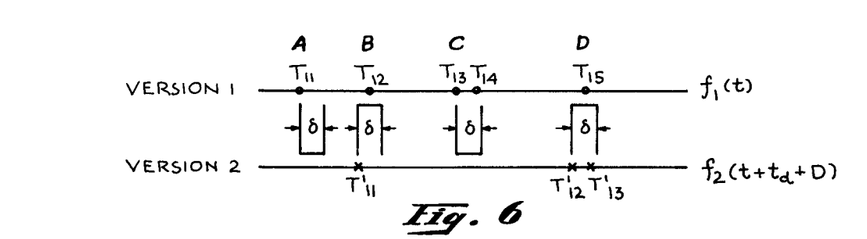
FIG. 6 is a graph showing the zero crossings of the two time displaced versions of a message and useful in explaining a modified method of the invention.

Referring to FIG. 6, let $f_0(t)$ be the true message received on channel 1 and $f_0(t+t_d)$ be the true message received on channel 2, $t_d$ being the relative delay in their arrival times. Let $f_1(t)$ be version 1 corrupted by noise and $f_2(t+t_d+D)$ be version 2 corrupted by noise but also delayed by a known amount D. The two noises are, of course, statistically independent.

The operation is as follows. A zero crossing, on either version, turns on a narrow time gate of duration $\delta$. (If $\bar{\tau}$ is the mean spacing between successive zero crossings on either version, it is assumed that $\delta$ is substantially less than $\bar{\tau}$.) If a crossing on the other version occurs during time $\delta$, an event is registered, otherwise no event is registered.

For example, at location A in FIG. 6, a crossing at $T_{11}$ turns on the gate. Since there is no crossing on version 2 during the interval $\delta$, no event is registered. At the end of the time interval $\delta$, the gate is turned off.

At location B, the gate is turned on by a crossing at $T'_{11}$ on version 2. During the interval $\delta$, a crossing occurs at $T_{12}$ on version 1. Thus an event is registered. The gate is turned off at the end of the interval $\delta$.

Another possible situation is shown at location C. Here the gate is turned on by a crossing at $T_{13}$ on version 1 and a crossing occurs at $T_{14}$ within the interval $\delta$ on the same version 1. Since both crossings arise from the same message version, no event is registered.

At location D, the gate is turned on by a crossing at $T'_{12}$ on version 2. Within the interval $\delta$ a crossing occurs at $T_{15}$ on version 1 and a crossing occurs at $T'_{13}$ on version 2. Consequently, one event will be registered even though an extra crossing $T'_{13}$ occurs during $\delta$. The same result would obtain if the extra crossing had occurred on version 1 instead of version 2.

As previously stated, this third method involves the introduction of known amounts of delay between the two message versions so as to bring them closer to coincidence. For each value of delay introduced it is contemplated that an output signal will be developed which will represent how close the zero crossings of the two versions approach coincidence. The output signal will be a function of the number of events registered within a given period of time, each event consisting of the occurrence of a crossing in each version within the gate interval $\delta$. The value of imposed delay corresponding to the maximum signal, or maximum number of events registered, is then taken to be the true delay between the two versions.

A simple analysis will show that the number of events registered is a function of the displacement between the two versions. It is assumed that the time gate is very small compared to the average spacing between adjacent zero crossings in either version. If the two versions are widely out of phase, or out of coincidence, the statistical chances that a pair of zero crossings (one from each version) will occur within a given gate interval is very small. Hence the number of events registered for a given period of time will be small. As the versions are brought closed together, the chances of pairs of crossings occurring will improve, since the time displacement between the two versions is more nearly approaching the value of the gate interval $\delta$. The number of events registered will therefore increase. When the two versions coincide, there will be an event registered for each zero crossing which turns on the gate. Hence the number of events will be a maximum at this time.

Figure 7:
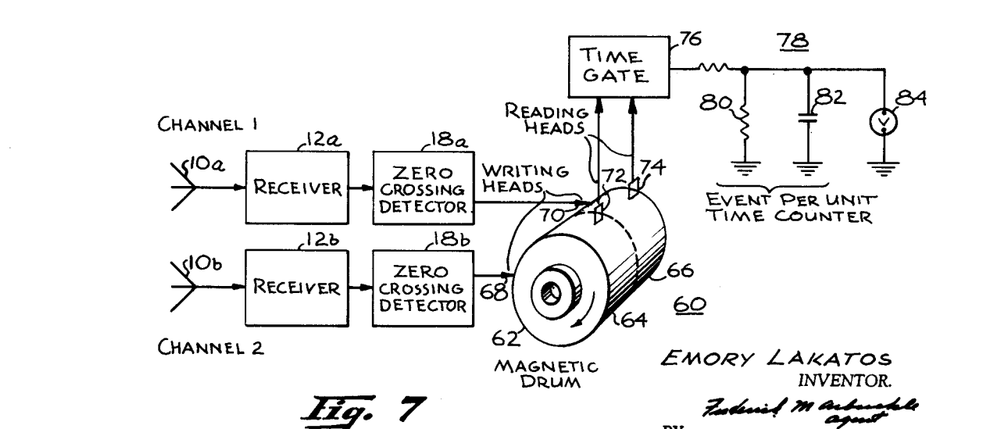
FIG. 7 is a partly schematic and partly block diagram showing apparatus for practicing the method illustrated graphically in FIG. 6.

One form of apparatus for carrying out the above described method is shown in FIG. 7. The two signals are received in channels 1 and 2 by antennas 10a and 10b and fed to respective receivers 12a and 12b where they are demodulated. After demodulation, the two versions are fed to zero crossing detectors 18a and 18b. Each of the detectors 18a and 18b produces an output pulse upon the occurrence of a zero crossing in the message version fed to it.

The pulse outputs of the detecors 18a and 18b are then fed to a magnetic recorder 60 comprising a rotatable magnetic drum 62 having two storage channels or tracks 64 and 66, a pair of writing heads 68 and 70 for receiving the two pulse trains and transducing them for storage on the two tracks 64 and 66, and a plurality of pairs of reading heads, only two of which, 72 and 74, are shown. The reading heads 72 and 74 are displaced by fixed known amounts relative to each other about the circumference of the drum. By displacing the various pairs of reading heads by different amounts, different amounts of relative time delay can be imposed between the two message versions which are already delayed by an amount which it is sought to determine.

The outputs of the reading heads 72 and 74 are fed to a time gate 76. The time gate 76 is turned on for a predetermined short interval $\delta$ by a pulse signal from either one of the reading heads 72 and 74. If, during the interval $\delta$ it is turned on, the time gate 76 receives a pulse signal from the reading head other than the one which enabled the gate 76, a pulse signal is produced in the output of the time gate 76. No signal will be produced in the output of the time gate 76 unless a pair of pulses (one from each reading head) are received during the time interval $\delta$.

The output of the time gate 76 is fed to an event counter 78 which produces a signal output representative of the number of events occurring within a given time. The event counter 78 may comprise a parallel circuit of a resistor 80 and a capacitor 82. It will be seen that a series of pulses applied to the parallel circuit will result in a charging and discharging of the capacitor 82.

The average voltage across the capacitor 82 is determined by the levels to which the capacitor 82 is permitted to discharge between pulses. The discharge levels are in the first instance determined by the frequency of the pulses. Consequently, the output voltage, which may be observed on a meter 84, is indicative of the number of events per unit time.

A separate gate and counter (not shown) is provided for each of the other pairs of reading heads, so that separate output signals can be produced for each of the different imposed delays. The amount of imposed delay corresponding to the maximum output signal is then equal to the time delay between the two message versions.

What is claimed is:

1. Apparatus for determining the difference in timing phase between two time displaced versions of an alternating current signal comprising: means responsive to the first version for developing a first signal train of pulses representing the zero crossings defined by the intersections of the first version with an axis thereof; means responsive to the second version for developing a second signal train of pulses representing the zero crossings defined by the intersections of the second version with an axis thereof; means for generating a train of timing pulses recurrent with a period which is substantially less than the average time spacing between successive pulses in each of said signal trains; means responsive to said first signal train for developing a first count signal representing the total accumulated number of said timing pulses which occur successively between the pulses in said first signal train over a first predetermined time interval; means responsive to said second signal train for developing a second count signal representing the total accumulated number of said timing pulses which occur successively between the pulses in said second signal train over a second predetermined time interval substantially equal to said first predetermined time interval; means responsive to said first signal train for developing a third count signal representing the number of pulses which occur in said first signal train over said first predetermined interval; means responsive to said second signal train for developing a fourth count signal representing the number of pulses which occur in said second signal train over said second predetermined interval; and means for combining said first, second, third, and fourth count signals to produce a resultant output signal representing the difference in timing phase between said two versions.

2. The method of determining the difference in timing phase between two time displaced versions of an alternating current signal comprising: developing a first signal train of pulses representing the zero crossings defined by the intersections of the first version with an axis thereof; developing a second signal train of pulses representing the zero crossings defined by the intersections of the second version with an axis thereof; generating a train of timing pulses recurrent with a period which is substantially less than the average time spacing between successive pulses in each of said signal trains; developing a first count signal representing the total accumulated number of said timing pulses which occur successively between the pulses in said first signal train over a first predetermined time interval; developing a second count signal representing the total accumulated number of said timing pulses which occur successively between the pulses in said second signal train over a second predetermined time interval substantially equal to said first predetermined time interval; developing a third count signal representing the number of pulses which occur in said first signal train over said first predetermined interval; developing a fourth count signal representing the number of pulses which occur in said second signal train over said second predetermined interval; and combining said first, second, third and fourth count signals to produce a resultant output signal representing the difference in timing phase between said two versions.

3. The method of determining the difference in timing phase between two time displaced versions of an alternating current signal comprising: developing a first signal containing pulse-like variations representing the zero crossings defined by the intersections of the first version with an axis thereof; developing a second signal containing pulse-like variations representing the zero crossings defined by the intersections of the second version with an axis thereof; applying said signals to a time gate whereby to cause said time gate to open for predetermined time intervals upon a first occurrence of a pulse-like variation from either one of said first and second signals; and developing during respective intervals an output signal corresponding to the frequency of occurrence of pulse-like variations from the signal other than the one which caused opening of said gate, said output signal serving to represent the difference in timing phase between said signal versions.

4. Apparatus for determining the relative time displacement between two coherent electrical alternating current signals comprising: control means for providing a reference potential level; first means responsive to said control means to provide a pulse-like output signal each time the first of said alternating current signals passes through said reference potential level; second means responsive to said control means to provide a second pulse-like output signal each time the second of said two alternating current signals passes through said reference potential level; and third means coupled to said first and second means for combining said output signals for providing a resultant output signal representing the frequency of occurrence of said pulse-like output signals of both said first and second means within a preselected time interval, said frequency of occurrence being an indication of the relative time displacement between said coherent two alternating current signals.

5. Apparatus for determining the time difference between two time displaced versions of an alternating current signal comprising: control means for providing a reference potential level; first means responsive to said control means to provide a pulse-like output signal each time the first version of said alternating signal passes through said reference potential level; second means responsive to said control means to provide a second pulse-like output signal each time the second version of said alternating signal passes through said reference potential level; first counter means responsive to said first pulse-like output signal for totalling the time intervals represented by each of said output pulses following the first output pulse of said pulse-like output signal in a predetermined time $t_d$; second counter means responsive to said second pulse-like output signal for totalling the time intervals represented by each of said output pulses following the first output pulse of said second pulse-like output signal in a predetermined time $t_d$; and accumulator means coupled to said first and second counter means for algebraically combining the outputs thereof to produce a resultant output signal representative of the difference in time between said two versions.

6. Apparatus for determining the time difference between two time displaced versions of an alternating current signal comprising: control means for providing a reference potential level; first means responsive to said control means to provide a pulse-like output signal each time the first version of said alternating signal passes through said reference potential level; second means responsive to said control means to provide a second pulse-like output signal each time the second version of said alternating signal passes through said reference potential level; generator means for producing a train of timing pulses each pulse of which is substantially less than the average time spacing between said pulse-like output signals of each of said versions; accumulator means responsive to said first pulse-like output signal for totalling the number of said timing pulses which occur successively between each pulse-like output signal in said first signal version and responsive to said second pulse-like output signal for totalling the number of pulses which occur successively between each of the second pulse-like output signal in said second signal version, said accumulator means providing an output signal which is a function of said first and said second pulse-like output signals; and means energized by said output signal of said accumulator means to produce a resultant output signal indicating the difference in timing displacement between said two signal versions.

7. Apparatus for determining the time difference between two time displaced versions of an alternating current signal comprising: control means for providing a reference potential level; first means responsive to said control means to provide a pulse-like output signal each time the first version of said alternating signal passes through said reference potential level; second means responsive to said control means to provide a second pulse-like output signal each time the second version of said alternating signal passes through said reference potential level; generator means for producing a train of counting pulses each pulse of which is substantially less than the average time spacing between said pulse-like output signals of each of said versions; accumulative means responsive to said first pulse-like output signal for developing a first count signal totalling the number of counting pulses which occur successively between each pulse-like output signal in said first signal version; accumulative means responsive to said second pulse-like output signal for developing a second count signal totalling the number of counting pulses which occur successively between each of the second pulse-like output signals in said second signal version; first event counter means responsive to said first means for developing a third count signal representing the number of pulse-like signals which occur in said first version over a first predetermined interval and second event counter means responsive to said second means for developing a fourth count signal representing the total number of pulse-like signals which occur in said second pulse-like signal output over a second predetermined time interval; said first and second time intervals being of substantially the same time duration; adder means for additively combining said third and fourth count signals to obtain a fifth signal; subtracter means for subtractively combining said third and fourth count signals to obtain a sixth signal; and means for combining said first and second count signals with said fifth and sixth signals to produce a resultant output signal representing the difference in timing phase between said two versions.

8. Apparatus for determining the time difference between two time displaced versions of an alternating current signal comprising: control means for providing a reference potential level; first means responsive to said control means to provide a pulse-like output signal each time the first version of said alternating signal passes through said reference potential level; second means responsive to said control means to provide a second pulse-like output signal each time the second version of said alternating signal passes through said reference potential level; generator means for producing a train of timing pulses each pulse of which is substantially less than the average time spacing between said pulse-like output signals of each of said versions; accumulator means responsive to said first pulse-like output signal for developing a first count signal totalling the number of timing pulses which occur successively between each pulse-like output signal in said first signal version; accumulator means responsive to said second pulse-like output signal for developing a second count signal totalling the number of timing pulses which occur successively between each of the second pulse-like output signals in said second signal version; first event counter means responsive to said first pulse-like output signal for developing a third count signal representing the number of pulse-like signals which occur in said first pulse-like output signal over a first predetermined time interval; second event counter means responsive to said second pulse-like output signal for developing a fourth count signal representing the number of pulse-like output signals which occur in said second pulse-like signal over a second predetermined time interval; and computer means for combining said first, second, third and fourth count signals according to the formula $$\frac{S_1}{N_1} - \frac{S_2}{N_2}$$

where $S_1$, $S_2$, $N_1$ and $N_2$ represent the first, second, third and fourth count signals respectively, to obtain a resultant output signal representing the difference in timing phase between said two versions.

9. Apparatus for determining the difference in timing displacement between two time displaced versions of an alternating current signal comprising: first generator means responsive to the first version for developing a first train of pulses representing the zero crossings defined by the intersections of the first version with an axis thereof; second generator means responsive to the second version for developing a second signal train of pulses representing the zero crossings defined by the intersections of the second version with an axis thereof; gating means coupled to said first and said second generator means and energizable by said first and second signal trains to be opened for a preselected time interval by a first occurrence of either of the pulses in said first or said second signal trains and, while opened, being operable to provide an output signal only when further energized by a pulse of the signal train other than the signal train having the pulse which opened said gating means; and indicating means energizable by the output signals of said gating means for indicating a summation of said output signals of said gating means, the magnitude of said summation being a function of the difference in timing displacement between the two time-displaced versions of alternating current signal.

10. Apparatus for determining the difference in timing displacement between two time displaced versions of an alternating current signal comprising: first generator means responsive to the first version for developing a first train of pulses representing the zero crossings defined by the intersections of the first version with an axis thereof; second generator means responsive to the second version for developing a second signal train of pulses representing the zero crossings defined by the intersections of the second version with an axis thereof; time delay means for introducing predetermined discrete time delays between said signal trains; gating means coupled to said time delay means and energizable by said first and second signal trains, as delayed by said time delay means, to be opened for a preselected time interval by a first occurrence of either of the pulses in said first or said second signal trains and while opened being operable to provide an output signal only when further energized by a pulse of the signal train other than the signal train having the pulse which opened said gating means; and indicating means energizable by output signals of said gating means for indicating a summation of said output signals of said gating means, the magnitude of said summation being a function of the difference in timing displacement between the two time displaced versions of said alternating current signal resulting from the introduction of a respective one of said discrete time delays.

11. In a system for determining the location of an object with respect to a plurality of spaced receiver stations by determining the delay in the time of arrival at a first one of said stations of a first version of an alternating current signal, transmitted along a path between said object and said first station, relative to the time of arrival at a second one of said stations of a second version of said alternating current signal, transmitted along a path between said object and said second station, the combination comprising: means for receiving said first and second versions at said first and second stations respectively; means for transmitting said versions from said first and second stations to a central station; and means at said central station for determining the difference in time displacement between said two time displaced signal versions, said last-mentioned means including: first generator means responsive to the first version for developing a first train of pulses representing the zero crossings defined by the intersections of the first version with an axis thereof; second generator means responsive to the second version for developing a second signal train of pulses representing the zero crossings defined by the intersections of the second version with an axis thereof; gating means coupled to said first and to said second generator means and energizable by said first and said second signal trains to be opened for a preselected time interval by a first occurrence of either of the pulses in said first or said second signal trains and while opened being operable to provide an output signal only when further energized by a pulse of the signal train other than the signal train having the pulse which opened said gating means; and indicating means energizable by output signals of said gating means for indicating a summation of said output signal of said gating means, the magnitude of said summation being a function of the difference in timing displacement between the two time displaced versions of said alternating current signal.

References Cited in the file of this patent

UNITED STATES PATENTS

| | | |
|---|---|---|
| 1,406,996 | Morrill | Feb. 21, 1922 |
| 2,166,991 | Guanella | July 25, 1939 |
| 2,320,476 | Schrader et al. | June 1, 1943 |
| 2,468,109 | Richardson et al. | Apr. 26, 1949 |
| 2,513,477 | Gubin | July 4, 1950 |
| 2,760,132 | Pawley | Aug. 21, 1956 |
| 2,855,594 | Bac | Oct. 7, 1958 |
| 2,866,373 | Doyle et al. | Dec. 30, 1958 |
| 2,873,444 | Dean | Feb. 10, 1959 |
| 2,877,416 | Grisdale | Mar. 10, 1959 |
| 2,920,306 | Feagin et al. | Jan. 5, 1960 |
| 2,940,076 | Bissett et al. | June 7, 1960 |

FOREIGN PATENTS

| | | |
|---|---|---|
| 672,015 | Great Britain | May 14, 1952 |